(12) United States Patent
Hafer et al.

(10) Patent No.: US 6,215,319 B1
(45) Date of Patent: Apr. 10, 2001

(54) HIGH ACCURACY MEASURING SYSTEM

(76) Inventors: Kevin G. Hafer, 2241 Woodvale Ave., Mt. Penn, PA (US) 19606; L. Jonathan Kramer, 1035 Catalpa Rd., Warmister, PA (US) 18974-4049

( * ) Notice: Subject to any disclaimer, the term of this patent is extended or adjusted under 35 U.S.C. 154(b) by 0 days.

(21) Appl. No.: 09/127,169

(22) Filed: Jul. 31, 1998

Related U.S. Application Data

(60) Provisional application No. 60/054,582, filed on Aug. 1, 1997.

(51) Int. Cl.$^7$ .................................................. G01R 27/26
(52) U.S. Cl. ............................................ 324/679; 324/678
(58) Field of Search .................................... 324/678, 679, 324/606, 76.13, 705; 341/143

(56) References Cited

U.S. PATENT DOCUMENTS

| | | | |
|---|---|---|---|
| 3,746,975 | 7/1973 | Maltby | 324/65 R |
| 3,993,947 | 11/1976 | Maltby et al. | 324/60 R |
| 4,434,407 | 2/1984 | Healey, III et al. | 331/4 |
| 4,718,036 | 1/1988 | Halbert et al. | 364/829 |
| 4,815,001 | 3/1989 | Uthe et al. | 364/477 |
| 5,521,556 | 5/1996 | O'Shaughnessy et al. | 331/1 R |

*Primary Examiner*—Safet Metjahic
*Assistant Examiner*—Vincent Q. Nguyen

(57) ABSTRACT

A measuring system for measuring a variable physical parameter by varying a reference signal above and below the magnitude of the physical parameter. The difference between the varying reference and the varying physical parameter is used to create an output signal representative of the magnitude of the parameter. A preferred embodiment of the invention uses a feedback-controlled system to vary the reference in such manner as to cause the time integral of the difference to be minimized. The reference is varied at a controlled rate, and the direction in which the reference is being varied is reversed when a function of the difference reaches some predetermined level. A function of the limits between which the reference has recently been varied is representative of the magnitude of the physical parameter.

10 Claims, 4 Drawing Sheets

HIGH ACCURACY MEASURING SYSTEM

CROSS REFERENCE TO RELATED APPLICATIONS

This application is related to U.S. Provisional Patent Application Serial No. 60/054,582, filed Aug. 1, 1997, entitled "High Accuracy Measuring System (provisional application expired)" the contents of which are hereby incorporated by reference in their entirety.

FIELD OF THE INVENTION

The present invention relates to systems for measuring variable physical parameters by creating a variable reference. More specifically, the invention relates to a system for varying the reference above and below the magnitude of the variable physical parameter that is being measured, and determining the magnitude of the parameter by calculating a function of the difference between the reference and the parameter.

BACKGROUND OF THE INVENTION

Prior systems for measuring variable physical parameters typically comprise the following steps: creating a variable reference; comparing the variable reference to the parameter being measured; and varying the magnitude of the reference until it is substantially equal to that of the parameter. Such systems create a digital signal representative of the magnitude of the reference and employ the digital signal in signal processing to create whatever output is desired from the measuring system.

Generally, the step of creating the digital signal requires using a device known as a comparator. A comparator has a bistable output which changes state according to the sign of the difference between two input signals. Unfortunately, the speed with which such a device reacts to a change of the sign of the difference is dependent upon the magnitude of the difference and/or the rate of change of the difference. Further, as a consequence of its bistable operation, comparators exhibit hysteresis. Hysteresis can cause a comparator's measurement to vary according to the direction from which the magnitude of the reference approaches the magnitude of the parameter. These limitations in comparator technology have diminished the accuracy and success of prior measuring systems. Thus, there is a need in the art for a high-accuracy measurement system that compensates for limitations in comparator technology. Further, such a system should operate with low power comparators and be inexpensive as well as simple to operate.

SUMMARY OF THE INVENTION

The present high accuracy measuring system addresses the above described and other shortcomings in the art. According to one aspect of the invention there is provided a measuring system comprising the following elements: a source electrical circuit which presents a variable physical parameter signal; a digital to analog converter having a reference input for accepting a reference signal and a data input for accepting a data signal, which digital to analog converter generates a variable reference signal; an amplifier electrically connected to the digital to analog converter and the source circuit, which amplifier generates a difference signal representative of the difference between the variable reference signal and the variable physical parameter signal; a comparator electrically connected to the amplifier, which comparator generates a bistable signal indicative of the sign of the difference signal; and a logic device electrically connected to the comparator and the digital to analog converter, which logic device has a first input for receiving the bistable signal from the comparator and a first output for sending a data signal to the data input of the digital to analog converter. The logic device varies the data signal transmitted to the digital to analog converter so as to cause the variable reference signal generated by the digital to analog convertor to oscillate between two limiting values. A mathematical function of the two values provides a measurement of the variable physical parameter. In a preferred embodiment the logic device is a microcomputer and the mathematical function is the average of the two limiting values.

According to one embodiment, the system may further comprise an integrator electrically connected to the amplifier. The integrator generates an integrated signal proportional to the time integral of the difference signal. The comparator is electrically connected to the integrator and generates a bistable signal indicative of the sign of the integrated signal. In such a system the logic device varies, at a substantially constant rate and as a function of the bistable signal, the data signal transmitted to the digital to analog converter so as to cause the variable reference signal to oscillate at a fixed rate between the two limiting values.

According to another aspect of the invention, there is disclosed a method for measuring a variable physical parameter. The method comprises the following steps: presenting a variable physical parameter signal; generating a variable reference signal; generating a signal representative of the difference between the variable reference signal and the variable physical parameter signal; generating a bistable signal indicative of the sign of the difference; varying the variable reference signal so that the variable reference signal oscillates between two limiting values, wherein a mathematical function, preferably the average, of the two values is a measurement of the variable physical parameter signal. In an alternative embodiment the physical parameter signal may be a function of the limiting values and prior measured limiting values.

In a preferred embodiment, the method of measuring a variable physical parameter may further comprise the step of taking the time integral of the difference and generating a bistable signal indicative of the sign of the time integral. In such a method, the variable reference signal may be varied at a substantially constant rate and as a function of the bistable signal, so that the variable reference signal oscillates at a fixed rate between the two limiting values.

BRIEF DESCRIPTION OF THE DRAWINGS

A full understanding of the invention can be gained from the following description of preferred embodiments when read in conjunction with the accompanying drawings in which.

DETAILED DESCRIPTION OF PREFERRED EMBODIMENTS

Figure 2:
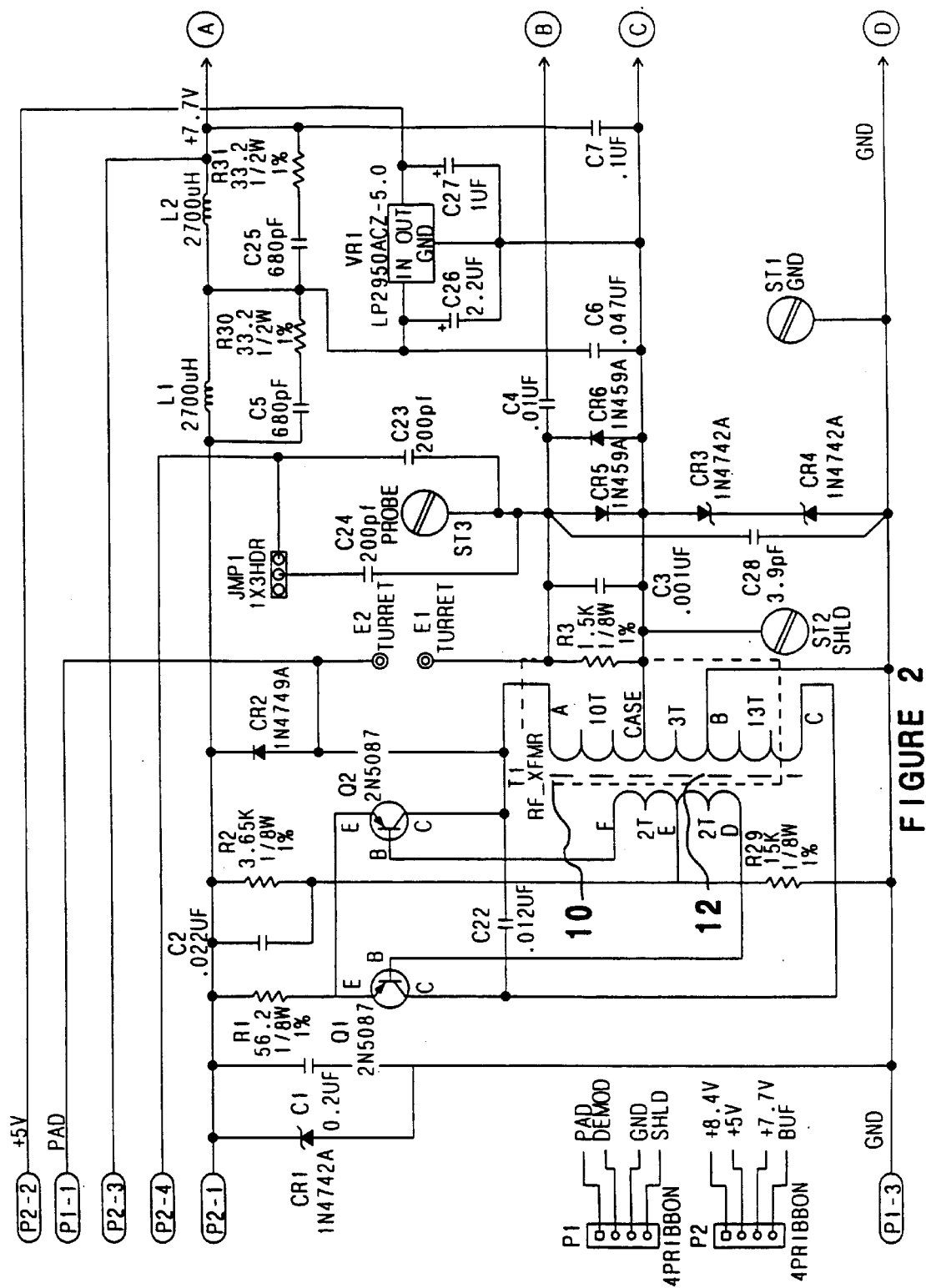
FIGS. 2 and 2A are schematic diagrams showing several components compatible for use in the present invention.
Figure 3:
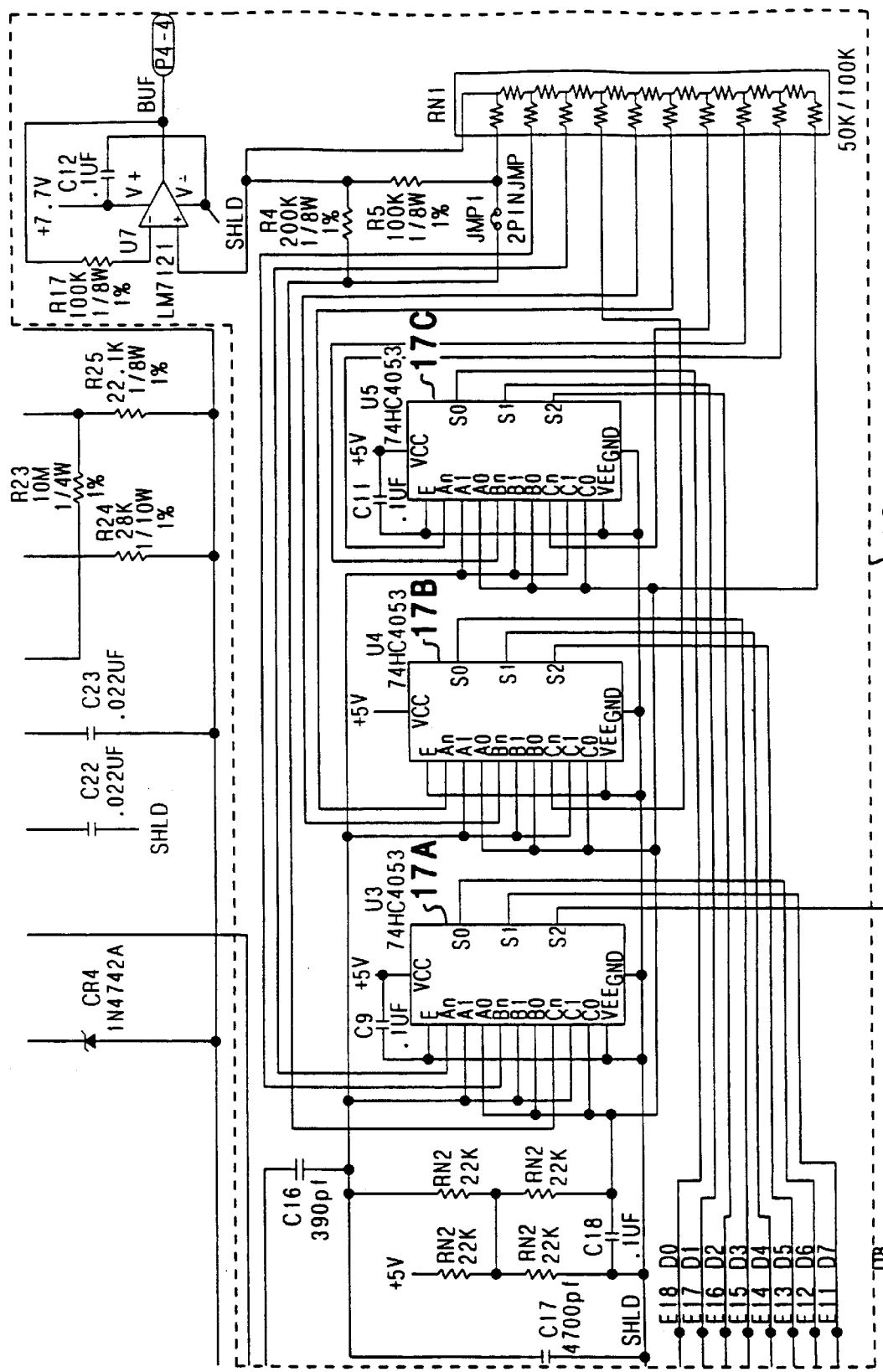
FIG. 3 is a schematic diagram showing a multiplying digital to analog convertor compatible for use in the present invention.

A high accuracy measuring system with the above-mentioned beneficial features in accordance with a presently preferred exemplary embodiment of the invention will be described below with reference to FIGS. 1–3. It will be appreciated by those of ordinary skill in the art that the description given herein with respect to the figures is for explanatory purposes only and is not intended in any way to limit the scope of the invention. All questions regarding the scope of the invention may be resolved by referring to the appended claims.

According to the present invention, the magnitude of the reference signal is repeatedly varied above and below the magnitude of the parameter being measured, and the difference is used to create an output signal representative of the magnitude of the parameter. A preferred embodiment of the invention uses a feedback-controlled system to vary the reference in such manner as to cause the time integral of the difference to be minimized. The reference is varied at a controlled rate, and the direction in which the reference is being varied is reversed when a function of the difference reaches a predetermined level. A function of the limits between which the reference has recently been varied is taken as representative of the magnitude of the parameter.

Figure 1:
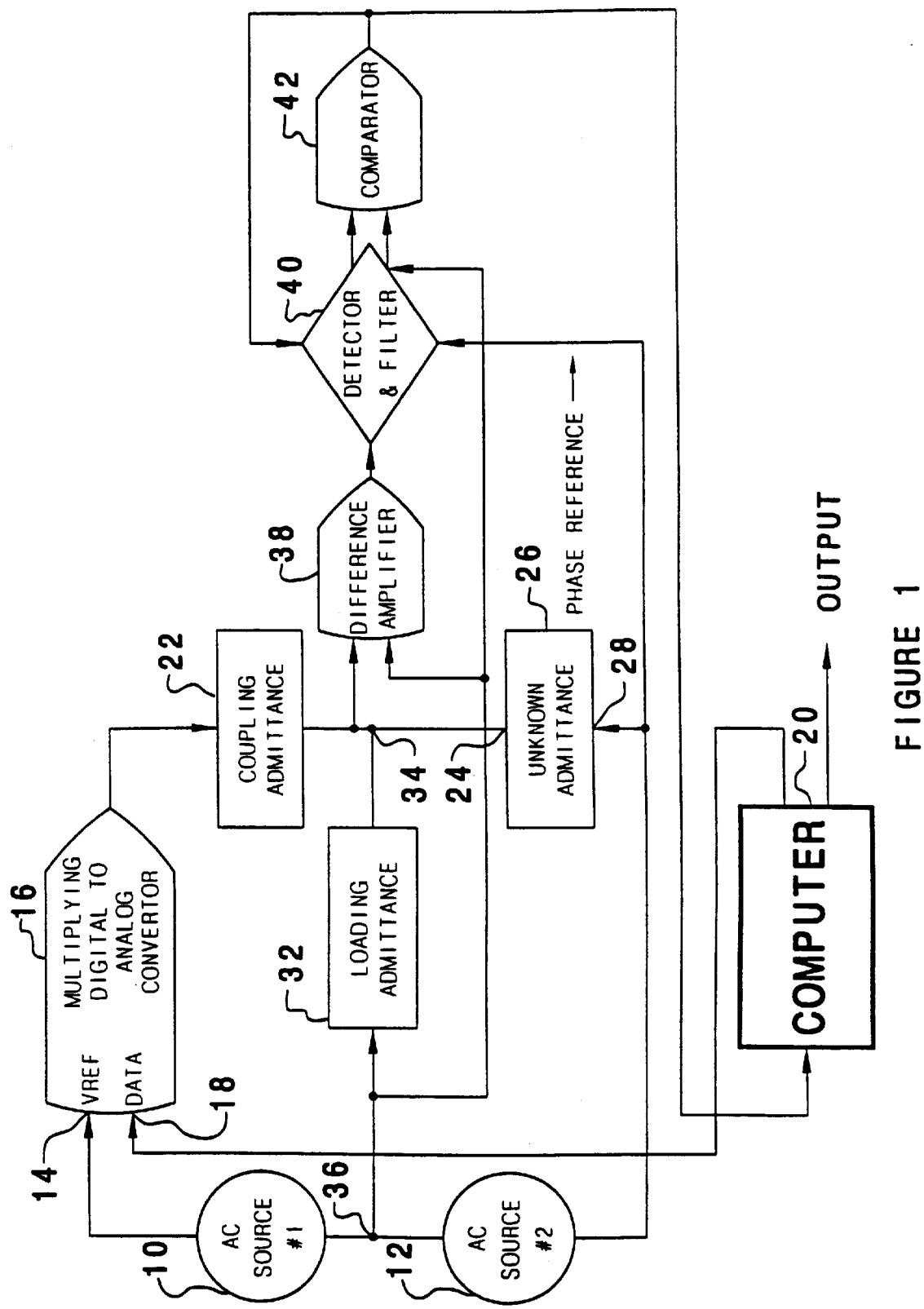
FIG. 1 is a block diagram of a preferred embodiment of the inventive system.
Figure 2A:
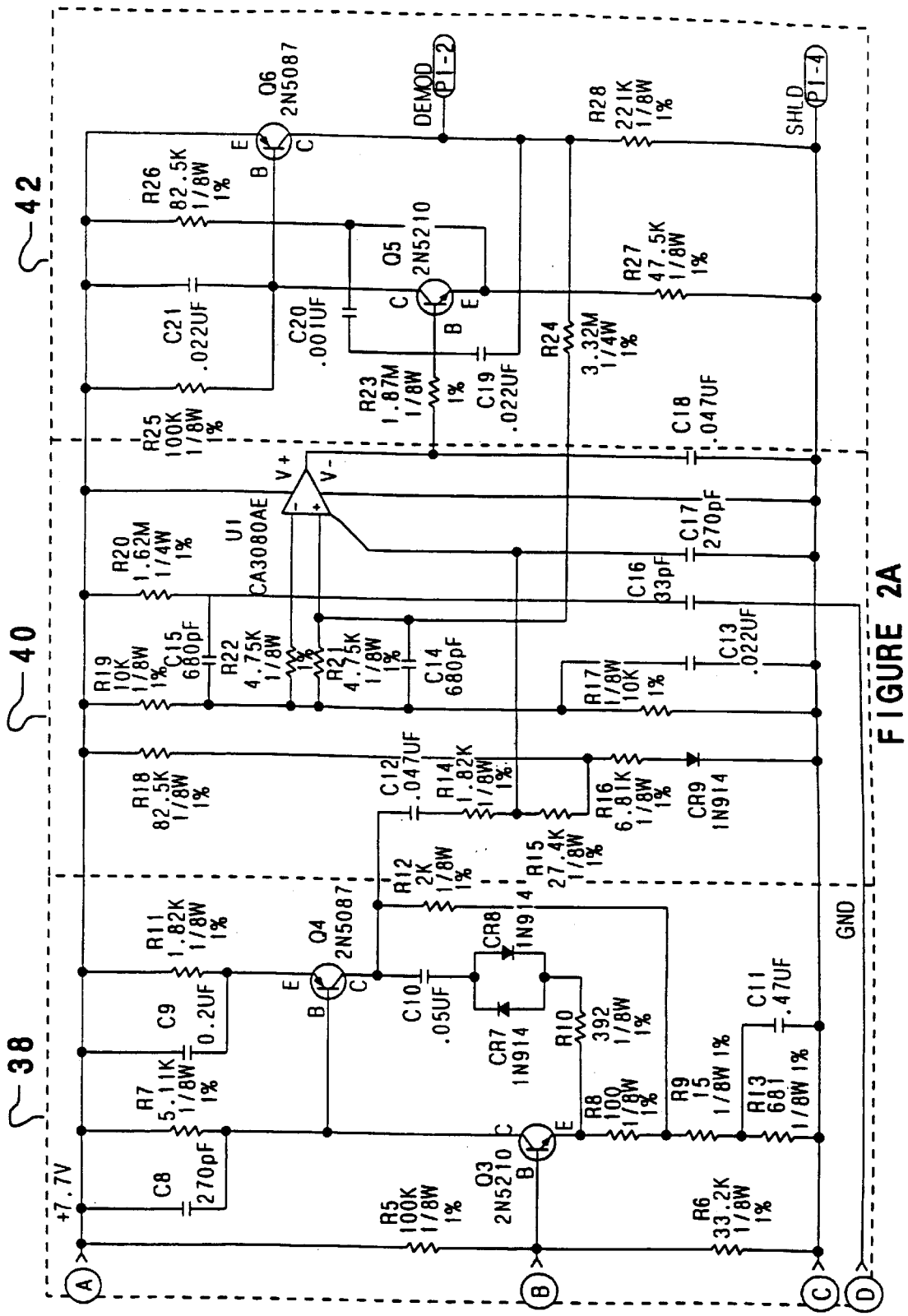

FIG. 1 provides a block diagram of a preferred embodiment of the inventive system incorporated into a self-rebalancing admittance bridge. It should be noted that the self-rebalancing admittance bridge could be any one of the following: a bridge capable of measuring conductance; a bridge capable of measuring susceptance; and a bridge capable of measuring some combination of conductance and susceptance. Also, it should be recognized that although the present invention is described with reference to an admittance bridge, the scope of the invention in no way should be limited to such applications. Referring to FIG. 1, two series-connected alternating current sources, 10 and 12, provide alternating voltages with the same frequency and phase. Voltages with these characteristics may be created by applying a source of alternating voltage to a transformer having a tightly coupled tapped winding. Schematic diagrams of voltage sources compatible for use in the present invention are shown on FIGS. 2 and 2A. Referring to FIG. 1, the high potential end of AC source 10 is connected to the "reference input" 14 of multiplying digital-to-analog convertor (MDAC) 16. MDAC 16 also has an input 18 for accepting digital data from a device such as an up-down counter or preferably a microcomputer 18. A schematic diagram of an MDAC 16 compatible for use in the present invention is shown on FIG. 3. 17A–C may be 74HC4053 chips such as those manufactured by Harris Corporation. Referring back to FIG. 1, the output of MDAC 16 is connected through coupling admittance 22 to high potential end 24 of unknown admittance 26. Low potential end 28 of unknown admittance 26 is returned to low potential end 30 of AC source 12. In a preferred embodiment, low potential end 30 has a ground potential.

Loading admittance 32 is connected from the junction 34 of coupling admittance 22 and unknown admittance 26 to junction 36 of AC source 10 and AC source 12. This connection restricts the range of variation of the voltage at junction 34 of coupling admittance 22 and unknown admittance 26 with respect to the voltage at junction 36 of AC source 1 and AC source 2. The restricted variation in the voltage prevents difference amplifier 38 from being overloaded when the bridge is far off balance.

Difference amplifier 38 compares the voltage at junction 34 of coupling admittance 22 and unknown admittance 26 to the voltage at junction 36 of AC source 10 and AC source 12. When the product of the output of MDAC 16 (measured with respect to the junction of AC Source 10 and AC Source 12) multiplied by coupling admittance 22 is equal to the product of the voltage of AC source 10 multiplied by unknown admittance 26, the voltage at junction 34 of coupling admittance 22 and unknown admittance 26 will be equal to the voltage at junction 36 of AC source 10 and AC source 12. This condition is commonly referred to as "bridge balance."

The voltage at the output of difference amplifier 38 is applied to detector/filter 40. Detector/filter 40 produces an output voltage (with respect to junction 36 of AC source 10 and AC source 12) proportional to the time integral of the product of the output of difference amplifier 38 (with respect to junction 36 of AC source 10 and AC source 12), multiplied by the voltage of AC source 12. Low potential end 30 of AC source 12 is connected to detector/filter 40 to serve as a reference.

The output of detector/filter 40 is applied to comparator 42. Comparator 42 produces a bistable output voltage indicative of the sign of the difference between the voltages on the comparator's 40 input. The output of comparator 42 is applied to computer 20 and is also fed back positively to detector/filter 40 to introduce a small, controlled amount of hysteresis. Schematic diagrams of an amplifier 38, detector/filter 40, and comparator 42 all of which are compatible for use in the present invention are shown on FIG. 2.

Computer 20 supplies a data word to MDAC 16 and thereby controls the voltage applied to the top of coupling admittance 16. Computer 20 also calculates any required output signals. It should be noted that although a computer-controlled MDAC 16 is shown in FIG. 1, the functions which are described as being performed by MDAC 16 could also be performed by an analog signal processing means or by a collection of hardwired logic elements without changing the nature of the invention.

The present invention addresses several problems that exist in the art. Prior attempts to detect bridge balance by detecting the change of state of a comparator have failed due to the decrease in magnitude of the differential signal applied to the comparator, and consequently in its speed of response, as the bridge approaches balance. The hysteresis required for bistable operation has also hindered this approach, since it causes an apparent offset in the point at which the comparator switches.

The present system operates by varying the reference value repeatedly above and below the magnitude of the parameter being measured. The magnitude of the parameter is determined by calculating a function of the difference between the reference and the parameter. The difference becomes substantial as the reference is varied. Thus, unlike prior systems, the comparator is presented with a difference that is sufficiently large to enable the comparator to react quickly. Also, because the magnitude of the reference approaches the magnitude of the parameter from both directions, the hysteresis of the comparator does not cause an error in the measured value.

Rather than attempt to keep the bridge at balance, computer 20 varies at a substantially constant rate above and below the balance point of the bridge the value sent to MDAC 16. As a consequence, the bridge is driven far enough beyond the balance point to make the signal applied to comparator 42 large enough to cause it to switch quickly. When computer 20 senses the change of state of comparator 42, it reverses the direction in which it is varying the value sent to MDAC 16, beginning the same process in the opposite direction.

The above process is continuously repeated, causing the value sent to MDAC 16 to have a triangular graph when plotted as a function of time. The value at which the bridge is balanced is the mean of the limits between which the value sent to the MDAC is varying. If, due to errors in comparator 42, the limits were not symmetrical about the value corresponding to actual bridge balance, a net unbalance would result in the product being integrated by detector/filter 40. This would cause the mean value of the output of detector/filter 40 to slowly drift in a direction which tended to correct the unbalance. Thus, the integrating action of detector/filter 40 makes the accuracy of the system substantially independent of the characteristics of the comparator 42.

In some systems, particularly those by Maltby (see, for example, U.S. Pat. No. 3,746,975, the contents of which are hereby incorporated by reference in their entirety), it is desirable to independently measure the conductive and susceptive components of an admittance. The present invention is readily adapted to such systems. For example, two independent sets of MDAC's and coupling admittances may be used, one to rebalance the conductive portion of unknown admittance 26, and one to rebalance the susceptive portion. Detector/filter 40 may be designed via control by the computer to change the phase angle of the voltage from low end 30 of AC source 12 approximately 90 degrees. Changing the phase angle permits the susceptive unbalance and the conductive unbalance of the bridge to be independently measured. This method has the advantage of directly measuring the conductive and susceptive components of the unknown impedance while minimizing the effect of one component while the other is being measured.

Alternatively, the phase angle of the coupling impedance may be varied under the control of the computer. In such an embodiment, additionally the phase of detector/filter 40 may be varied approximately 90 degrees under the control of the computer. This method produces independent measurement of the magnitude and phase of the unknown admittance.

Because techniques for supplying power to components of a system are well known, no power supplies have been described. It should be noted, however, that it is desirable to supply power to the blocks which operate with signals referenced to the junction of AC source 10 and AC source 12, which are at the same AC potential as that junction. Such an arrangement may be seen in U.S. Pat. No. 3,993,947, the contents of which are hereby incorporated by reference in their entirety.

Although exemplary embodiments of the invention have been described in detail above, those skilled in the art will readily appreciate that many additional modifications are possible in the exemplary embodiment without materially departing from the novel teachings and advantages of the invention. For example, those skilled in the art will appreciate that MDAC 16 could alternatively be an analog signal processing means or a collection of hard-wired logic elements. Further, computer 20 might alternatively be a hard-wired logic device or a simple programmable device. Those skilled in the art will also appreciate that the inventive system and method have many applications in addition to those described herein. For example, if the physical parameter to be measured is a slowly changing (with respect to the measurement cycle time) voltage or current, a system according this invention will serve as a fast highly accurate, low cost analog to digital converter (ADC). Accordingly, all such modifications are intended to be included within the scope of this invention as defined in the following claims.

We claim:

1. A measuring system for measuring a variable physical parameter, comprising:

a source electrical circuit presenting a variable physical parameter signal;

a digital to analog converter having a reference input for accepting a reference signal and a data input for accepting a data signal, said digital to analog converter generating a variable reference signal;

an amplifier electrically connected to said digital to analog converter and said source circuit, said amplifier generating a difference signal representative of the difference between said variable reference signal and said variable physical parameter signal;

a comparator electrically connected to said amplifier, said comparator generating a bistable signal indicative of the sign of said difference signal; and a logic device electrically connected to said comparator and said digital to analog converter, said logic device having a first input for receiving said bistable signal from said comparator and a first output for sending a data signal to said data input of said digital to analog converter, wherein said logic device varies said data signal transmitted to said digital to analog converter so as to cause said variable reference signal generated by said digital to analog convertor to oscillate between two limiting values, a mathematical function of said two values being a measurement of said variable physical parameter.

2. The measuring system of claim 1, further comprising:

an integrator electrically connected to said amplifier, said integrator generating an integrated signal proportional to the time integral of said difference signal, wherein said comparator is electrically connected to said integrator and generates a bistable signal indicative of the sign of said integrated signal.

3. The measuring system of claim 2, wherein said logic device varies, at a substantially constant rate and as a function of said bistable signal, said data signal transmitted to said digital to analog converter so as to cause said variable reference signal to oscillate at a fixed rate between said two limiting values.

4. The measuring system of claim 1, wherein said mathematical function is the average of said two limiting values.

5. The measuring system of claim 1, wherein said logic device is a microcomputer.

6. A method for measuring a variable physical parameter, comprising the steps of:

presenting a variable physical parameter signal;

generating a variable reference signal;

generating a signal representative of the difference between said variable reference signal and said variable physical parameter signal;

generating a bistable signal indicative of the sign of said difference;

varying said variable reference signal so that said variable reference signal oscillates between two limiting values, wherein a mathematical function of said two values is a measurement of the variable physical parameter signal.

7. The method of claim 6, wherein said mathematical function of said two limiting values and the histories of said two values is a measurement of the variable physical parameter.

8. The method of measuring a variable physical parameter of claim 6, further comprising the step of:

taking the time integral of said difference and generating a bistable signal indicative of the sign of said time integral.

9. The method of claim 8, wherein said variable reference signal is varied at a substantially constant rate and as a function of said bistable signal, so that said variable reference signal oscillates at a fixed rate between said two limiting values.

10. The method of claim 6, wherein said mathematical function is the average of said two limiting values.

* * * * *